Feb. 26, 1935.   W. E. BLYTHE   1,992,466
HEAT TREATING FURNACE
Filed Jan. 26, 1933   7 Sheets-Sheet 3

INVENTOR.
William E. Blythe
BY
Bartlett Eyre Scott & Keel,
ATTORNEYS

Feb. 26, 1935.　　　　W. E. BLYTHE　　　　1,992,466
HEAT TREATING FURNACE
Filed Jan. 26, 1933　　　7 Sheets-Sheet 4
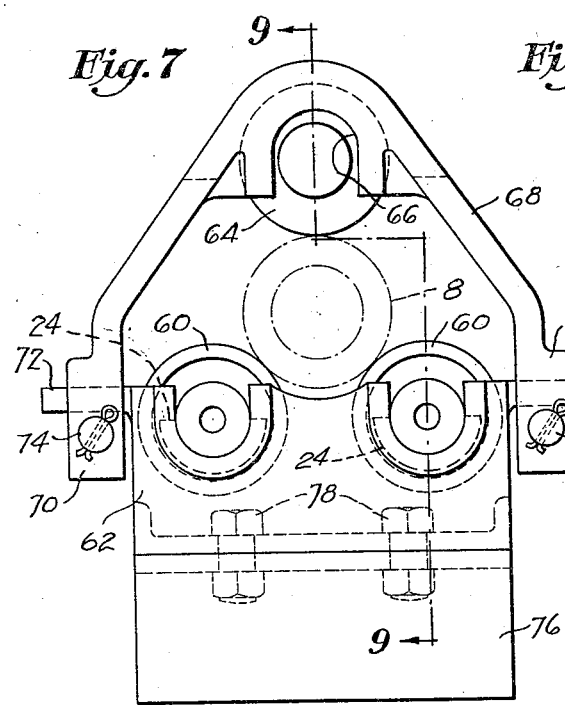
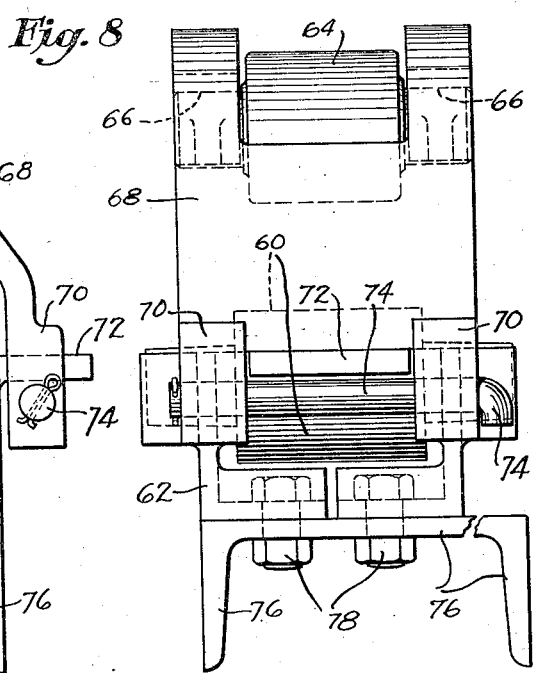
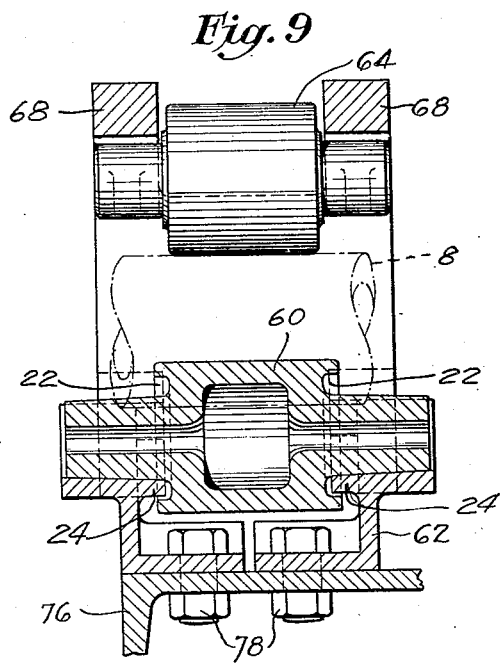
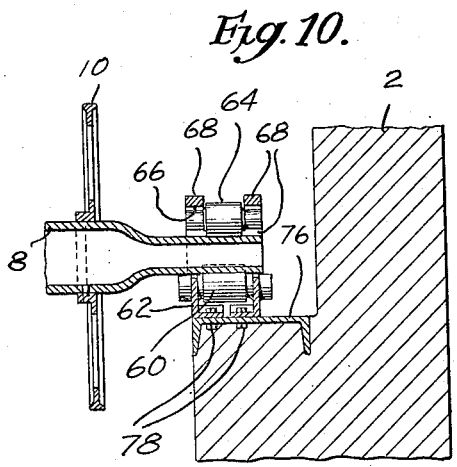
INVENTOR,
William E. Blythe
BY
ATTORNEYS

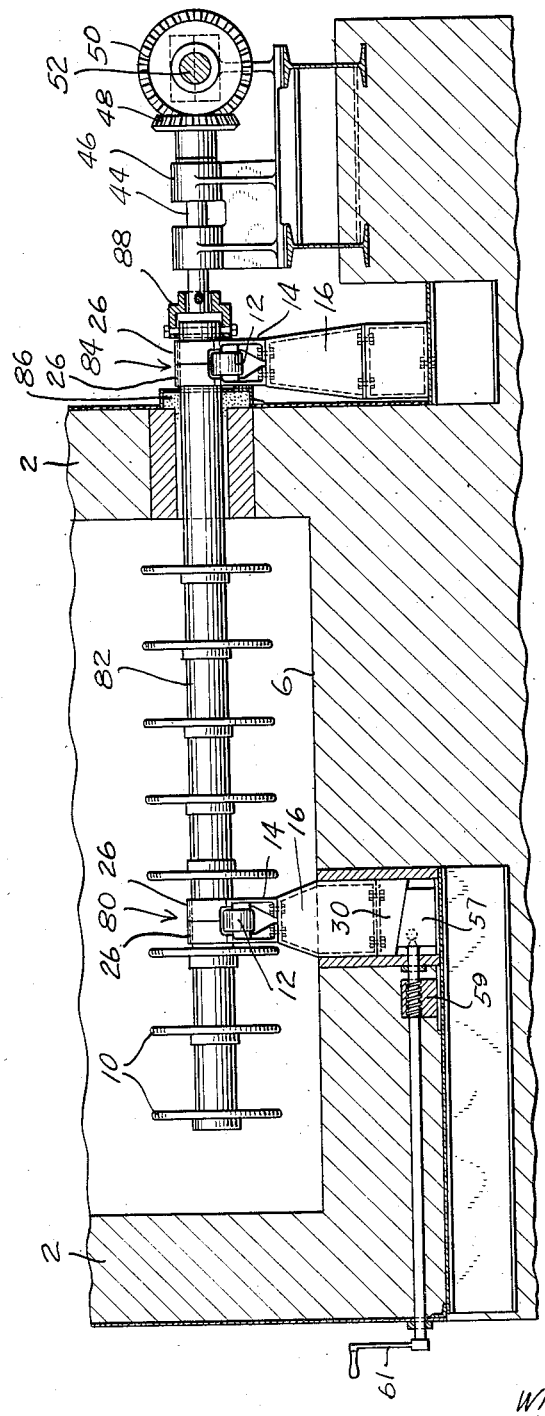

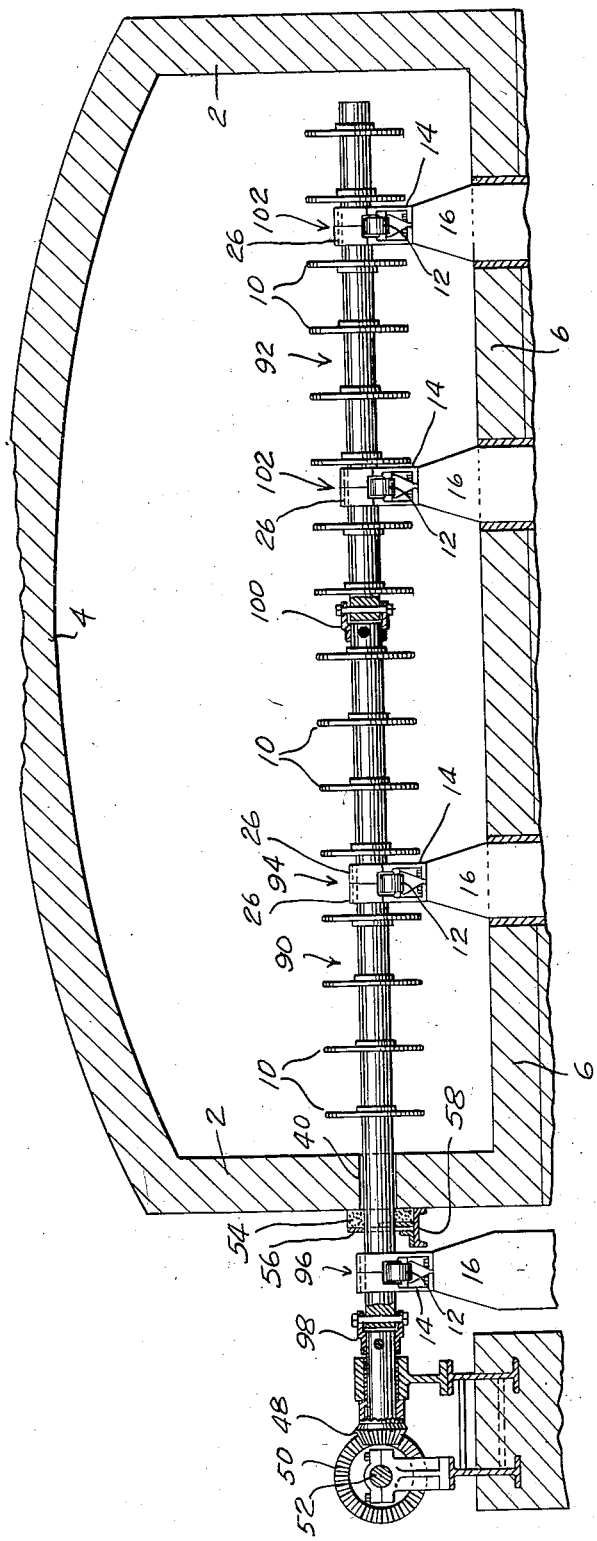

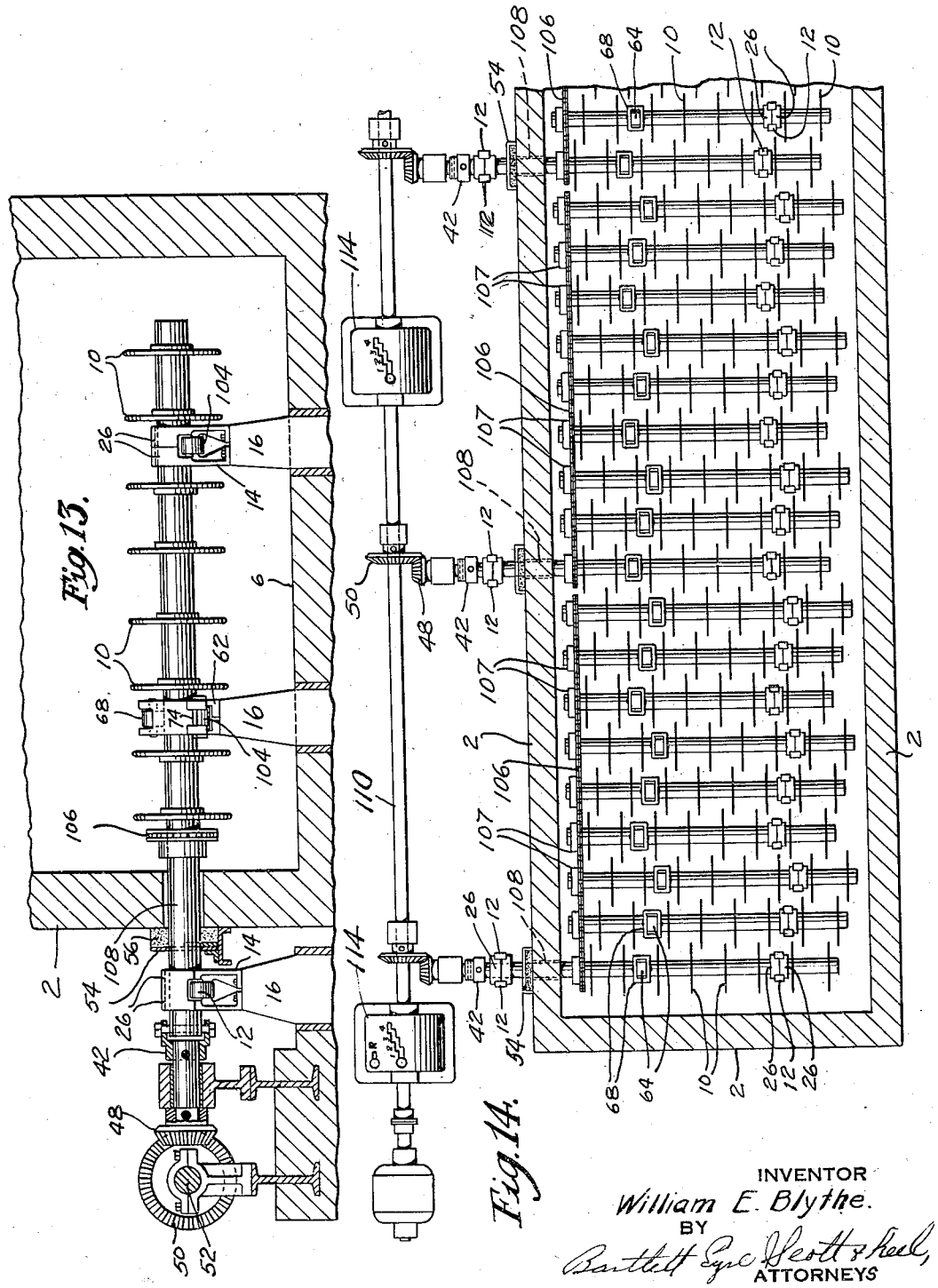

Patented Feb. 26, 1935

1,992,466

UNITED STATES PATENT OFFICE 1,992,466

HEAT-TREATING FURNACE

William E. Blythe, Birmingham, Mich., assignor to Driver-Harris Company, Harrison, N. J., a corporation of New Jersey Application January 26, 1933, Serial No. 653,656

18 Claims. (Cl. 263—6)

My invention relates to high temperature heat-treating furnaces of the type in which the material to be treated is conveyed through the furnace on rolls, and has for its object to provide a novel and improved furnace of this character.

The several features of the invention will be readily understood from the following description and accompanying drawings, in which:

Fig. 7 is a view corresponding to Fig. 3 of another form of bearing for the conveyor rolls that may be employed;

Fig. 8 is a side view of the same;

Fig. 9 is a sectional view, partly in elevation, taken on the line 9—9 of Fig. 7;

Fig. 10 is a detail sectional view, partly in elevation, of a portion of a furnace chamber and conveyor roll, the conveyor roll being shown supported on the bearing illustrated in Figs. 7, 8 and 9;

Fig. 11 is a view, corresponding to a portion of Fig. 1, of a modified form;

Fig. 12 is a similar view of another modified form;

Fig. 13 is a similar view of still another modified form; and

Fig. 14 is a diagrammatical plan view of the same.

Figure 1:
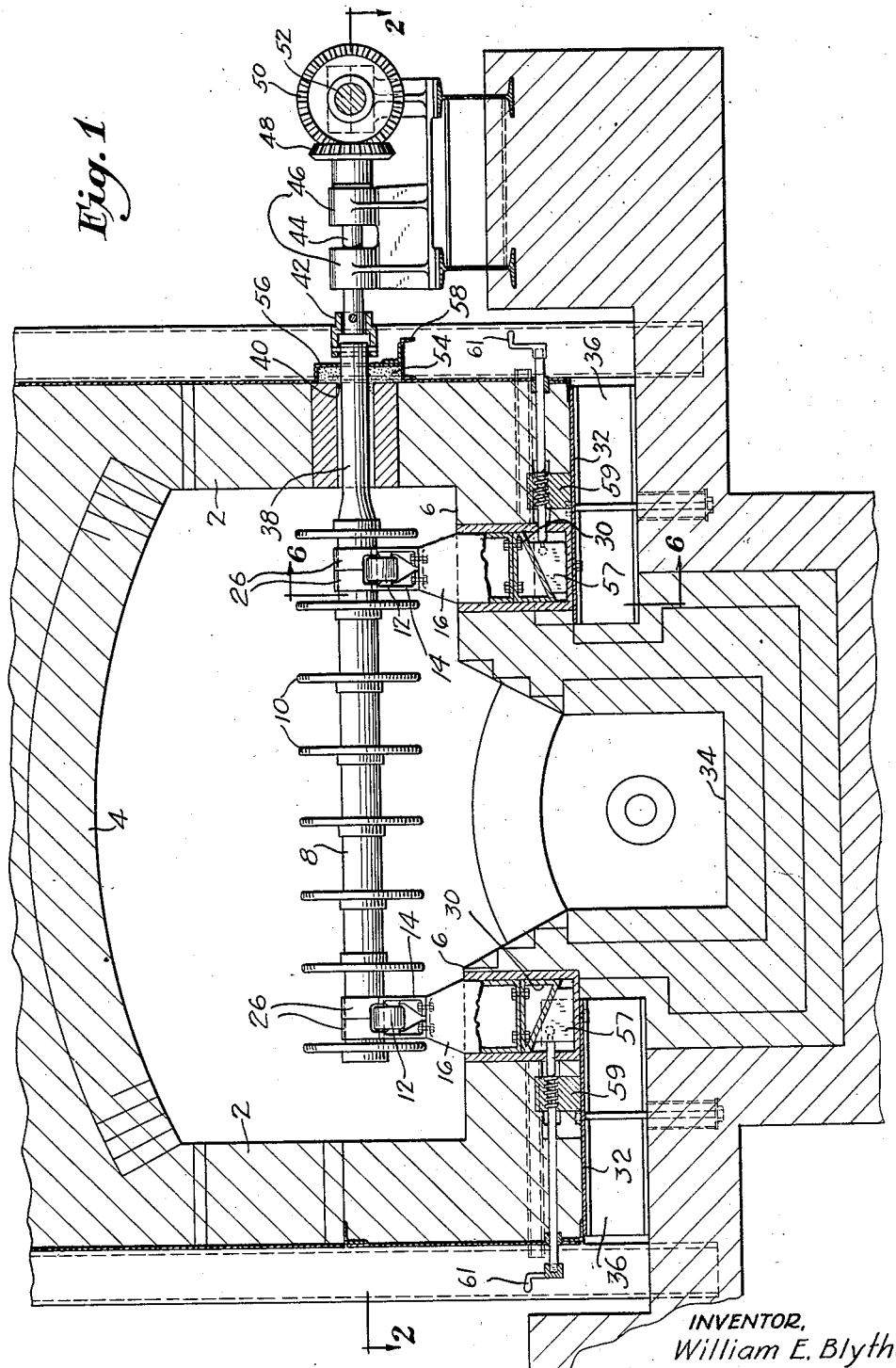
Figure 1 is a transverse sectional view, partly in elevation, of a heat-treating furnace embodying the features of my invention in their preferred form.

The furnace illustrated in the drawings is of the type of the one described and claimed in my Patent No. 1,843,440, dated February 2, 1932. This furnace is provided with a furnace chamber having side walls 2, a top wall 4 and a bottom wall 6, and conveyor rolls extending transversely of the furnace chamber. Each conveyor roll may comprise a hollow shaft 8 and if desired material conveying disks 10 secured thereon. The disks 10 of the several rolls may be arranged in staggered relation so as to permit each disk to extend into the spaces between adjacent disks of adjacent rolls.

Figure 2:
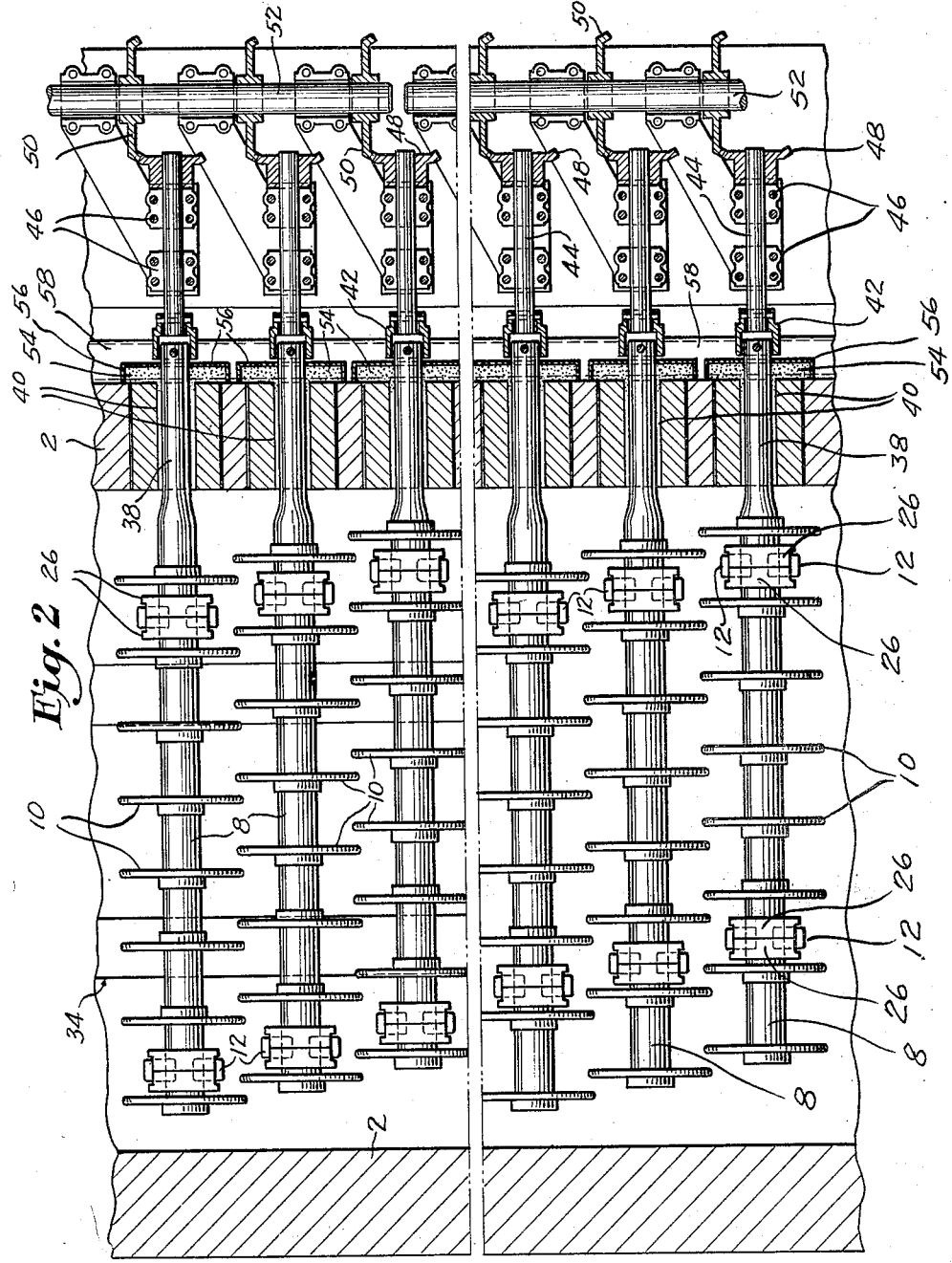
Fig. 2 is a sectional plan view taken substantially on the line 2—2 of Fig. 1, with parts broken away to save space.

In the construction shown in Figs. 1 and 2, each of the conveyor rolls is supported by bearing rollers 12 located within the furnace chamber. In the construction shown in Figs. 1 to 6, inclusive, the bearing rollers which are arranged in pairs have projecting axial trunnions thereon that are received in U-shaped bearing recesses in a cradle or support 14 mounted on a stool or pedestal 16. Each support 14 is made in two sections that are arranged in opposed relation. Each section is provided with a depending tongue 18 on its base that is received in a recess in the top of the pedestal 16. Each support section is further secured to the pedestal 16 by means of bolts 20. The bearing rollers 12 are each provided with annular cored out grooves or recesses 22 in its end faces that receive semi-circular projections 24 on the sections of support 14. These projections prevent the bearing roller from working out of the bearing recesses in the support. The sectional construction of the supports 14 enables the bearing rollers to be easily assembled therein with the projections 24 received in the grooves 22 in the rollers.

A hood 26 that may be made in two sections extends over each conveyor roll, the ends of the hood sections being respectively secured at 28 by welding or otherwise to the sections of the support 14. This hood prevents dirt and scale from the work from getting on the bearing rollers, and also ensures against the conveyor roll working off of the bearing rollers.

The pedestals 16 extend downwardly through the bottom of the furnace chamber, and have their lower ends supported on steel plates 32, there being a steel plate extending longitudinally of the furnace wall at each side of the flame or heating tunnel 34 of the furnace chamber. Each steel plate is supported by transversely extending I-beams 36.

Each of the conveyor rolls has a shaft extension 38 at one end which projects through an opening 40 in one wall of the furnace chamber. The outer end of this extension may be connected by a suitable flexible coupling 42 with a driving shaft 44 that is supported in bearings 46 outside of the furnace chamber. The shafts 44 are driven so as to drive the conveyor rolls through bevel gears 48 on their outer ends that are engaged by bevel gears 50 on one or more drive shafts 52. The opening through which the extension 38 of each conveyor roll extends may be sealed against the escape of gases from the furnace chamber, by a suitable stuffing-box comprising heat-insulating material 54 which may be enclosed in sheet metal containers 56 surrounding the extension. These containers 56 are supported on a channel iron 58 secured to the outer side wall of the furnace chamber.

The bearing rollers 12 for the conveyor rolls, their supports 14 and pedestals 16 are spaced inwardly from the side walls of the furnace. In the front part of the furnace where the usual tunnel 34 is located, the pedestals 16 may be located close to the sides of the tunnel, the bearing rollers at the inner ends of the conveyor rolls being located between the endmost disks. At the rear of the heating tunnel which is the hottest zone of the furnace, the pedestals may be placed closer together, and as shown the bearing rollers at the inner ends of the conveyor rolls may be positioned between the second and third disks. Thus the supports for each conveyor roll may be positioned directly beneath the work and close enough together that the span of the roll between the supports will effectively resist bending strain. The relative spacing of the conveyor rolls may vary to compensate for the difference in temperature of different zones of the furnace. The arrangement shown of bearing rollers and supports is such as not to interfere with the distribution of flame and heat from the tunnel.

By positioning the flexible couplings 42 outside of the furnace chamber and the heat-insulating material 54, the couplings are well protected from the heat of the furnace.

By embedding the lower portions of the pedestals 16 in the masonry of the bottom or base 6 of the furnace, and mounting them on steel supports well protected from the heat of the furnace as above described, they are rigidly held and effectively stand up under the weight of the conveyor rolls and work.

In order to compensate for growth in the diameters of the conveyor rolls, to insure proper engagement of the bearing rollers with the conveyor rolls and to maintain the rolls level, the bearing rollers are adapted to be adjusted vertically and this may be done during operation of the furnace. To provide for this, the bottom of each pedestal rests upon a wedge member 57 that is adapted to be moved in opposite directions to raise and lower the pedestal, by means of a shaft that has one end connected by a swivel joint with said wedge member. Said shaft has screw-thread engagement with a fixed member 59. Said shaft extends outside of the furnace, and is adapted to be turned by a hand-crank 61.

The conveyor rolls, bearing rollers, supports for the bearing rollers, pedestals 16 and flexible couplings 42 may all be made of nickel-chromium-iron or other suitable heat-resisting alloy, while the stud shafts 44 may be of steel.

The form of bearings shown in Figs. 7, 8 and 9 is particularly adapted for use in a furnace in which the conveyor rolls are started and stopped frequently and are driven at a relatively high speed. In this construction in addition to the bearing rollers 60 corresponding to the rollers 12, mounted in recesses in a sectional support 62, there is a floating roller 64 that engages the top of the conveyor roll. This roller 64 has trunnions on its ends that are mounted in recesses 66 in an inverted V-shaped yoke 68 which has a pair of spaced ears 70 on each of its lower ends arranged at opposite sides of a tongue 72 projecting outwardly from the adjacent side of the support 62. A pin 74 extends through each pair of ears and beneath the associated tongue 72. The floating roller 64 permits limited upward movement of the conveyor roll so as to prevent it from working off of the rollers 60, and at the same time allows for expansion and contraction of the conveyor roll.

The bearing shown in said Figures 7, 8 and 9 may engage the conveyor roll between the disks 10, or if desired the conveyor roll may be provided with reduced ends, one of which is shown in Fig. 10, and the reduced ends mounted in these bearings. In such case, the supports 62 may be mounted on channel members 76 or mounted in recesses in the furnace wall, the sections of each support 62 being secured to the channel iron 76 by bolts 78.

In the form shown in Fig. 11, there is but one bearing 80 located within the furnace for each conveyor roll. The other bearing 84 for this conveyor roll is located on the outside of the furnace adjacent the stuffing-box 86 that surrounds the extension of the conveyor roll. The end of this conveyor roll is connected by a flexible coupling 88 with a stud shaft corresponding to the stud shaft 44 of Fig. 1. In this construction the inner bearing and associated parts may be made of an alloy, but as the other bearing and also the flexible coupling 88 are located outside of the furnace, they may be made of steel. The bearing 80 is preferably located near the center of the furnace and at a point spaced from the inner end of the conveyor roll a distance of approximately one third the length of the conveyor roll.

With this arrangement, maximum support is secured with the use of but a single bearing within the furnace. Also, this construction is much less expensive as but a single bearing of a heat-resisting alloy need be employed. The single inner bearing construction of Fig. 11 may, if desired, be employed in a furnace for certain of the conveyor rolls and the two inner bearing constructions shown in Fig. 1 for other conveyor rolls to meet different conditions. As shown, the inner bearing 80 may be adjusted vertically to compensate for growth in the diameter of the conveyor roll and to maintain the roll level.

The form shown in Fig. 12 is particularly adapted for extremely wide furnaces. In this construction instead of making each conveyor roll in one piece, it is made in two or more sections 90 and 92. The section 90 may be similar to the conveyor roll shown in Fig. 11, it being provided with a single inner bearing 94 and an outer bearing 96, and a flexible coupling 98 connecting the outer end of the extension of the conveyor roll with a driving shaft corresponding to the shaft 44 of Fig. 1. The other section 92 of this conveyor roll may be connected by a flexible coupling 100 with the section 90. This section 92 may be supported by two inner bearings 102 that correspond in arrangement to the bearings 12 of the construction shown in Fig. 1. It may be noted that this construction enables the furnace to be made of any practical width without undue length of span between the bearings.

In the form shown in Figs. 13 and 14 the conveyor rolls may be supported on bearings 104 which may correspond in arrangement to the bearing rollers 12 of the form shown in Fig. 1. Instead, however, of one end of each conveyor roll having an extension which is operatively connected with a drive shaft 44 as in Fig. 1, the rolls are driven by means of sprocket chains 106 which pass over sprocket wheels 107 on the conveyor rolls, each chain engaging the sprockets of a group of conveyor rolls. The rear one of each group of conveyor rolls that are driven by the same sprocket chain, may have an extension 108 which may be connected with any suitable source of power outside of the furnace. In the construction shown the extensions 108 are driven through connection with a drive shaft 110 that is connected with the shaft of a motor 112. The shaft 110 may be made in sections as shown, and suitable change speed mechanism in boxes 114 may be employed to enable the speeds of different groups of conveyor rolls to be varied as desired. In this construction it may be noted that the necessity of having an opening in the furnace wall to provide for driving each of the conveyor rolls is dispensed with.

Figure 3:
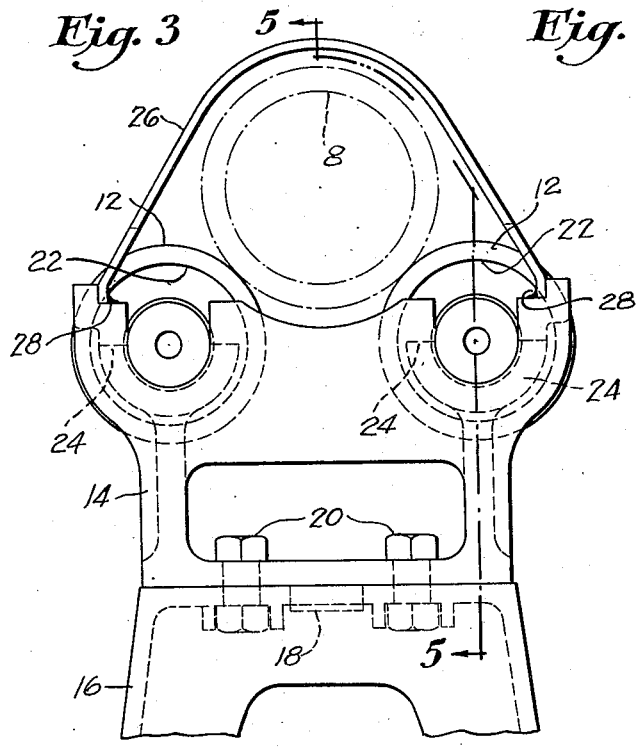
Fig. 3 is a detail end view of the upper portion of one of the bearings for the conveyor rolls.
Figure 4:
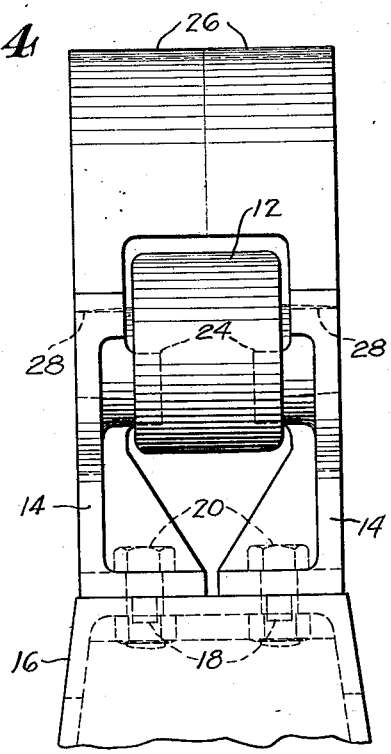
Fig. 4 is a side view of the same.
Figure 5:
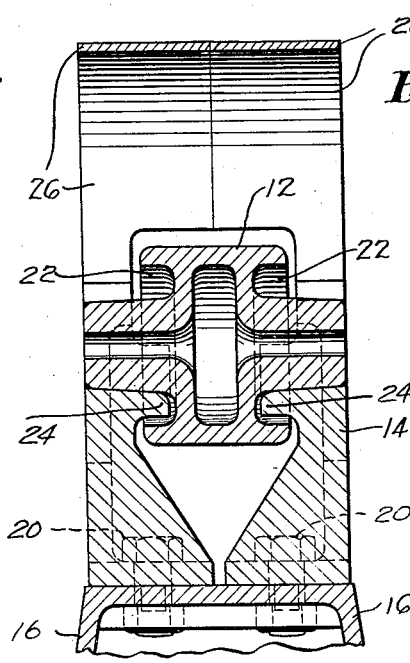
Fig. 5 is a sectional view taken on the line 5—5 of Fig. 3.
Figure 6:
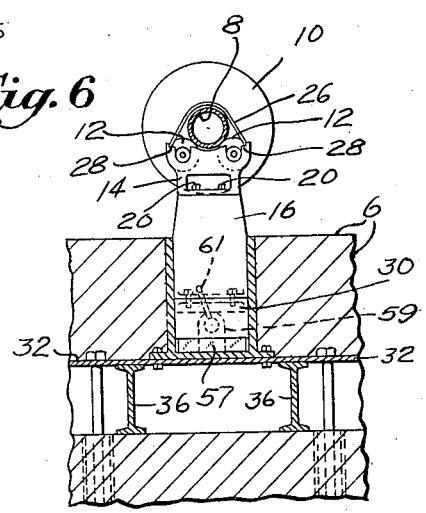
Fig. 6 is a detail sectional view, taken on the line 6—6 of Fig. 1.

The bearing 104 for each conveyor roll that is arranged adjacent the driven end of the roll may be of the form shown in Figs. 7, 8 and 9, while the other bearing may be of the form shown in Figs. 3, 4 and 5.

As will be evident to those skilled in the art, my invention permits various modifications without departing from the spirit thereof or the scope of the appended claims.

What I claim is:

1. In a heat-treating furnace of the class described, a furnace chamber having side walls, conveyor rolls extending across the furnace chamber with one end of each of the rolls terminating short of one of the side walls, and bearings for each of the rolls located within the furnace chamber, the improvement which comprises the other end of each of the rolls having an extension projecting through an opening in the other side wall, driving shafts supported outside of the furnace chamber, and means comprising a flexible coupling located outside of the furnace wall for establishing driving connection between said extension of each of the rolls and one of the driving shafts.

2. In a heat-treating furnace of the class described, a furnace chamber, conveyor rolls extending across the furnace chamber, bearing rollers for the conveyor rolls located within the furnace chamber, means comprising pedestals extending downwardly a distance through the bottom of the furnace chamber for supporting said bearing rollers, and means for rotating the several conveyor rolls.

3. In a heat-treating furnace of the class described, the combination of a furnace chamber having the bottom thereof made of masonry, conveyor rolls extending across the furnace chamber, bearing rollers for supporting the conveyor rolls located within the furnace chamber, means for supporting the bearing rollers comprising pedestals embedded in said masonry, and metal supports for the bottoms of the pedestals.

4. In a heat-treating furnace of the class described the combination of a furnace chamber, conveyor rolls extending across the furnace chamber, two bearing rollers arranged side by side and spaced apart longitudinally of each of the conveyor rolls and on which the conveyor roll rests, supports for the ends of the bearing rollers, the ends of the bearing rollers and said supports having portions overlapping and spaced apart for limiting the upward movement of the bearing rollers with relation to said supports, means secured to said supports and extending over the conveyor roll for limiting the upward movement of the conveyor roll, and a pedestal on which said supports are mounted extending downwardly through the bottom of the furnace chamber.

5. In a bearing for a conveyor roll of a heat-treating furnace of the class described, the combination of two bearing rollers arranged side by side and spaced apart on which the conveyor roll rests, the bearing rollers extending longitudinally of the conveyor rolls, supports for the ends of the bearing rollers, a roller for engaging the top of the conveyor roll when the conveyor roller is positioned on said two first mentioned bearing rollers, and means for holding the upper bearing roller in position on the conveyor roll but permitting limited upward movement of said roller.

6. In a heat-treating furnace of the class described, a furnace chamber having side walls, conveyor rolls extending across the furnace chamber, two sets of bearing rollers for each of the conveyor rolls located within the furnace chamber and respectively spaced inwardly from said side walls, means comprising pedestals for supporting said bearing rollers, means for rotating the several conveyor rolls, and means operable from a point outside of the furnace chamber for adjusting the vertical position of at least one set of bearing rollers.

7. In a heat-treating furnace of the class described, a furnace chamber having side walls, conveyor rolls extending across the furnace chamber, each of said rolls having one end terminating short of one of the side walls and having an extension on its other end projecting through an opening in the other side wall, two sets of bearing rollers for supporting each of the conveyor rolls, one set of bearing rollers being located within the furnace and the other set being located outside of the furnace wall, the latter supporting the outer end of said extension, a driving shaft for each of the rolls, and means comprising a flexible coupling connecting the end of each extension with the driving shaft.

8. In a heat-treating furnace of the class described, a furnace chamber, conveyor rolls extending across the furnace chamber, a plurality of sets of bearing rollers for each of the conveyor rolls, said sets of bearing rollers being located within the furnace chamber and means operable from the outside of the furnace for varying the vertical position of at least one set of said bearing rollers.

9. In a heat-treating furnace of the class described, a furnace chamber having side walls, conveyor rolls extending across the furnace chamber with one end of each of the rolls terminating short of one of the side walls, a plurality of sets of bearings for each of the rolls, at least one of them located within the furnace chamber, the other end of each of said conveyor rolls having an extension extending through an opening in the wall of the furnace chamber, driving shafts supported outside of the furnace chamber, and means comprising a flexible coupling located outside of the furnace wall for establishing driving connection between said extension of each of the rolls and one of the driving shafts.

10. In a heat-treating furnace of the class described, a furnace chamber having side walls, conveyor rolls extending across the furnace chamber with the ends of each of the rolls terminating short of the side walls, bearings for each of the rolls located within the furnace chamber, and means for driving the rolls comprising sprocket wheels on the rolls, and a sprocket chain operatively engaging said sprocket wheels.

11. In a heat-treating furnace of the class described, a furnace chamber having side walls, conveyor rolls extending across the furnace chamber with the ends of each of the rolls terminating short of the side walls, bearings for each of the rolls located within the furnace chamber, and means within the furnace chamber operatively connecting said rolls to cause them to rotate in unison.

12. In a heat-treating furnace of the class described having side walls, conveyor rolls extending across the furnace chamber with at least one end of each of the rolls terminating short of one of the side walls, each conveyor roll being made up of a plurality of sections arranged end to end, a flexible coupling connecting adjacent ends of adjacent sections, bearings for supporting each of said sections, and means for driving the rolls.

13. In a heat-treating furnace of the class described, a furnace chamber having side walls, conveyor rolls extending across the furnace chamber with one end of each of the rolls terminating short of one of the side walls, each of the rolls being made in a plurality of sections arranged end to end, a flexible coupling between adjacent ends of adjacent sections, bearings for supporting each of the sections, the bearings for the innermost section being located within the furnace, and one of the bearings for the other section being located within the furnace chamber and the other bearing located outside of the furnace chamber, and means for driving the rolls.

14. A heat-treating furnace of the class described having, in combination, a furnace chamber having side walls, conveyor rolls extending across the furnace chamber, bearings for each of the rolls located within and spaced from the walls of the furnace chamber, one end of each of the rolls having an extension projecting through an opening in the adjacent side wall, driving means for each of the conveyor rolls located outside of the furnace chamber, and means for flexibly coupling each of said extensions to its driving means, whereby the roll is free to expand and contract in all directions independently of the driving means therefor.

15. In a heat-treating furnace, a furnace chamber having side walls, conveyor rolls extending across the furnace chamber and at least one end of each roll terminating inside said chamber, bearings for each of the rolls located within the furnace chamber, driving means for each of the conveyor rolls located outside of the furnace chamber, and means for flexibly coupling each of the rolls to its driving means, and means operable outside of the furnace for adjusting the vertical position of at least one of the bearings.

16. A heat-treating furnace of the class described having, in combination, a furnace chamber having side walls, conveyor rolls extending across the furnace chamber with one end of each of the rolls terminating inside of said chamber, bearings for each of the rolls, at least one of said bearings being located within the furnace chamber and spaced from the walls thereof, one end of each of the rolls having an extension projecting through an opening in the adjacent side wall, driving means for each of the conveyor rolls located outside of the furnace chamber, and means outside of the furnace chamber for flexibly coupling each of said extensions to its driving means.

17. A heat-treating furnace of the class described having, in combination, a furnace chamber having side walls, conveyor rolls extending across the furnace chamber with at least one end of each roll terminating inside of said chamber, a bearing for each of the rolls located within the furnace chamber, one end of each of the rolls having an extension projecting through an opening in the adjacent side wall, a bearing outside of the furnace chamber supporting said extension for rotary movement and allowing angular movement of the roll caused by expansion and contraction of said inside bearing, driving means for the conveyor rolls located outside of the furnace chamber, and means for flexibly coupling said extensions of the rolls to said driving means.

18. A heat-treating furnace of the class described having, in combination, a furnace chamber having side walls, conveyor rolls extending across the furnace chamber with at least one end of each of the rolls terminating short of the adjacent side wall, bearings supporting the ends of each roll for rotary movement and allowing angular movement of the roll caused by expansion and contraction of one of its bearings with relation to the other bearing, driving means, and means within the furnace chamber for flexibly coupling the conveyor rolls to said driving means comprising a sprocket wheel carried by each roll, and a driving chain for the sprocket wheel.

WILLIAM E. BLYTHE.